United States Patent [19]
Alston

[11] Patent Number: 4,467,369
[45] Date of Patent: Aug. 21, 1984

[54] APPARATUS FOR EXPOSING PHOTOSENSITIVE MATERIAL TO VIDEO FRAME

[75] Inventor: Lawrence E. Alston, Chelmsford, Mass.

[73] Assignee: Polaroid Corporation, Cambridge, Mass.

[21] Appl. No.: 352,317

[22] Filed: Feb. 25, 1982

[51] Int. Cl.³ .............................................. H04N 9/49
[52] U.S. Cl. ....................................... 358/332; 358/75
[58] Field of Search ..................... 358/332, 75, 56, 59, 358/66

[56] References Cited

U.S. PATENT DOCUMENTS

| | | |
|---|---|---|
| 2,531,031 | 11/1950 | de France et al. |
| 2,941,030 | 6/1960 | Birch-Field .......................... 358/332 |
| 2,995,619 | 8/1961 | Freeman . |
| 3,006,260 | 10/1961 | Smith et al. ............................... 95/12 |
| 3,595,991 | 7/1971 | Diller ..................................... 358/59 |
| 3,644,664 | 2/1972 | Huboi et al. . |
| 3,720,859 | 3/1973 | Hilden ..................................... 315/23 |
| 3,772,465 | 11/1973 | Vlahos et al. . |
| 3,938,164 | 2/1976 | Ohnishi et al. .................. 346/110 R |
| 4,009,489 | 2/1977 | Seer, Jr. ................................... 358/80 |
| 4,027,315 | 5/1977 | Barney ..................................... 354/76 |
| 4,112,459 | 9/1978 | Gautier et al. ............................ 358/6 |
| 4,201,223 | 5/1980 | Barney ..................................... 128/653 |
| 4,240,729 | 12/1980 | Barney ..................................... 354/76 |
| 4,278,347 | 7/1981 | Okamoto et al. ...................... 355/68 |

*Primary Examiner*—Richard Murray
*Attorney, Agent, or Firm*—Edward S. Roman

[57] ABSTRACT

In a system for exposing a photosensitive material to a video frame represented by a video signal, the image to be photographed is horizontally scanned by a line scanner and the horizontal line scan is incrementally advanced across the video frame in correspondence with the incremental advancement of an exposing focused line across the photosensitive material in order to fully expose the photosensitive material, one line at a time, to the image being scanned by the line scanner.

24 Claims, 8 Drawing Figures

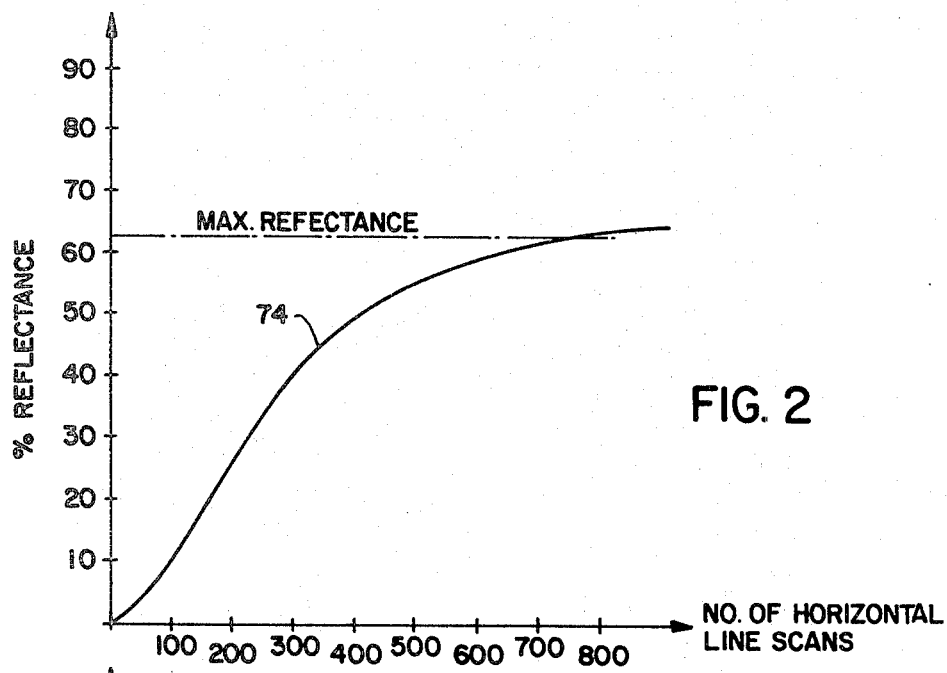
FIG. 2
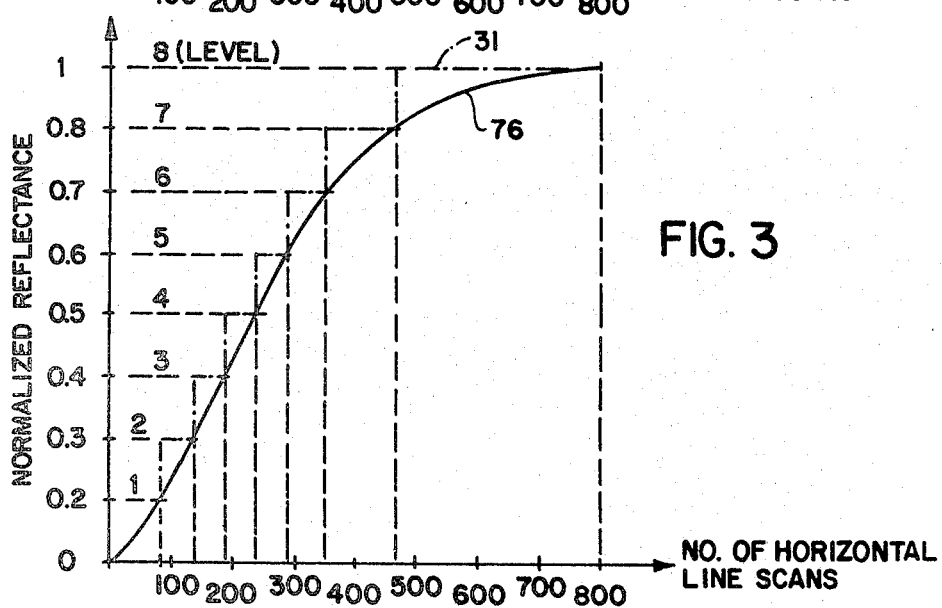
FIG. 3
| LEVEL | NO. OF LINE SCANS | Δ LINE SCANS |
|---|---|---|
| 1 | 90 | 90 |
| 2 | 140 | 50 |
| 3 | 190 | 50 |
| 4 | 240 | 50 |
| 5 | 290 | 50 |
| 6 | 350 | 60 |
| 7 | 470 | 120 |
| 8 | 800 | 130 |
FIG. 4

FIG. 6
|  | COUNT | RED | GRN | BLUE | LAST LEVEL INDICATOR |  |
|---|---|---|---|---|---|---|
| 1st ROW | 0 | 1 | 1 | 1 | 0 | ⎫ |
| 2nd ROW | 0 | 1 | 1 | 0 | 0 | ⎬ 1st LEVEL EXP. |
| 3rd ROW | 0 | 1 | 0 | 0 | 0 | ⎬ |
| 4th ROW | 0 | 1 | 0 | 0 | 0 | ⎭ |
| 5th ROW | 1 | 1 | 1 | 1 | 0 | ⎫ |
| 6th ROW | 0 | 1 | 1 | 0 | 0 | ⎬ 2nd LEVEL EXP. |
| 7th ROW | 0 | 1 | 0 | 0 | 0 | ⎭ |
|  | 1 | 1 | 1 | 1 | 0 | ⎫ |
|  | 0 | 1 | 1 | 0 | 0 | ⎬ |
|  | 0 | 1 | 0 | 0 | 0 | ⎬ 8th LEVEL EXP. |
|  | 0 | 1 | 0 | 0 | 0 | ⎭ |
| last ROW | 0 | 0 | 0 | 0 | 1 | LAST LEVEL RESET |
COLOR LOGIC: RED GRN BLUE
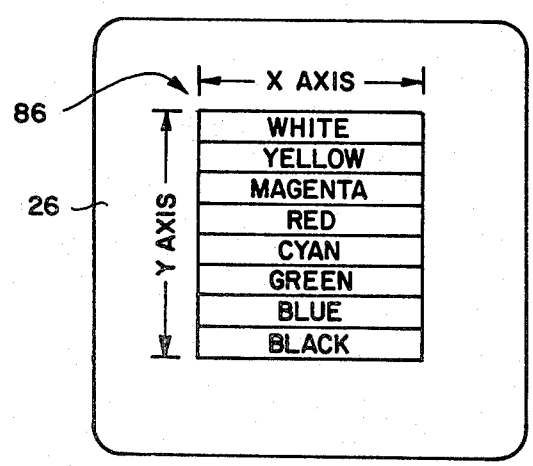
FIG. 7
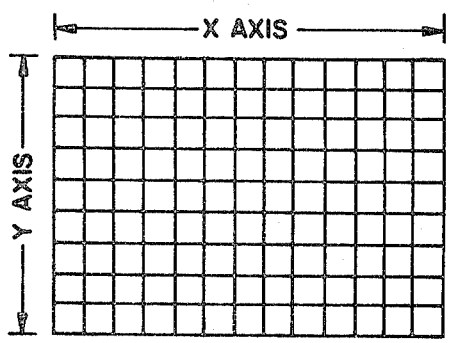
FIG. 8

APPARATUS FOR EXPOSING PHOTOSENSITIVE MATERIAL TO VIDEO FRAME

BACKGROUND OF THE INVENTION

1. Field of the Invention

This invention relates generally to apparatus for exposing a photosensitive material to a video frame as represented by a video signal and, more particularly, to apparatus for fully exposing photosensitive material one line at a time to an image which is simultaneously scanned by a line scanner.

2. Description of the Prior Art

One approach to obtaining a photographic image of a color television image is to directly photograph the screen of a color television using color film. This approach will reproduce the subject matter in a way which, while satisfactory for some purposes, is of a quality much poorer than that of a direct photograph of the scene being televised in terms of resolution, color rendition, contrast, etc. Another well-known technique is to first divide the color television signal into its color separation video signals, i.e., the red, blue, and green video signals, then sequentially display these signals on a monochromatic CRT whose screen is photographed through filters in a way that synchronizes the color of the filter to the color of the video signal being displayed on the screen. In this technique, color film would be exposed through a red filter to the image on the screen on a monochromatic CRT while the red color separation image is displayed; through a blue filter while the blue color separation image is displayed on the CRT and through a green filter while the green color separation image is displayed. The exposure times will depend on the optics, the phosphors of the CRT and the type of color film; and, the proper exposure time can be determined by trial and error. While this technique represents an improvement over the quality of an image produced by merely photographing a still frame color video picture, the non-linear response of the CRT in terms of light intensity to input signal level and the non-linear characteristics of most film materials represent inherent deficiencies that will not produce an image approaching the quality of a direct photograph of the scene being televised.

An improved method for obtaining a photographic image of a video frame as disclosed in U.S. patent application Ser. No. 341,317, entitled "Constant Light Greyscale Generator for CRT Color Camera System", by Lawrence E. Alston, filed Jan. 21, 1982, in common assignment herewith discloses an arrangement wherein the inherent non-linear response of the CRT in terms of light intensity to input signal level is overcome by utilizing a two level electron beam approach wherein the number of horizontal two level electron beam line scans is modulated by the control signal that would otherwise be utilized to control the electron beam intensity. Although this approach is a substantial improvement over and above what had heretofore been done, it nevertheless still utilizes red, green, and blue filters which must be sequentially moved by mechanical apparatus into place to expose the film to red, green, and blue color separation signals.

Therefore, it is a primary object of this invention to provide a system for exposing a photosensitive material to a video signal representing the image to be photographed without having to provide apparatus for mechanically moving a plurality of mechanical filters in an ordered sequence to sequentially expose the photographic material to the red, green, and blue color separation signals.

It is a further object of this invention to provide a simplified system for exposing a photosensitive material to a video signal representing an image to be photographed wherein the photosensitive material is fully exposed one line at a time to the image as it is scanned by a line scanner.

SUMMARY OF THE INVENTION

A system for exposing a photosensitive material to a video frame as represented by a video signal comprises lighting means responsive to input control signals for providing along a focused line any one color of light at a time selected from a predetermined plurality of different light colors. Means are provided for stationing a sheet of photosensitive material along the focused line for exposure to the colored light from the lighting means. Circuit means respond to the video signal to provide control signals to the lighting means to vary the intensity of the colored light provided by the lighting means along the focused line in response to the amplitude defined by the video signal at each instant. The circuit means also simultaneously selects a particular color of light from a plurality of different light colors defined by the video signal at each instant to expose the photosensitive material along the focused line. Means are also included for advancing the focused line across the photosensitive material in correspondence with each succeeding line across the video frame to which the photosensitive material is fully exposed.

The lighting means preferably comprises a plurality of light color determining strips arranged in parallel relation with respect to each other and lens means for focusing the colored light from the plurality of light color determining strips to the focused line. The circuit means provides control signals to the lighting means so as to vary the light intensity along any selected one of the color determining strips at a time in correspondence with the amplitude and color defined by the video signal at each instant.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with tne accompanying drawings wherein:

FIG. 2 is a typical characteristic curve for a given photosensitive material exposed with monochromatic light of a predetermined dominant wavelength;

FIG. 3 is a normalized version of the curve shown in FIG. 2;

FIG. 4 is a chart showing the incremental differences in exposure required to achieve the various levels along the curve of FIG. 3;

FIG. 6 is a chart showing a look-up table to which the read only memory in the circuit of FIG. 5 may be programmed;

FIG. 7 shows a diagram of a plurality of light color determining strips for the system of FIG. 5; and FIG. 8 shows a two dimensional array of light emitting elements which may be utilized in place of the CRT of FIGS. 1 and 5.

DESCRIPTION OF THE PREFERRED EMBODIMENTS

Figure 1:
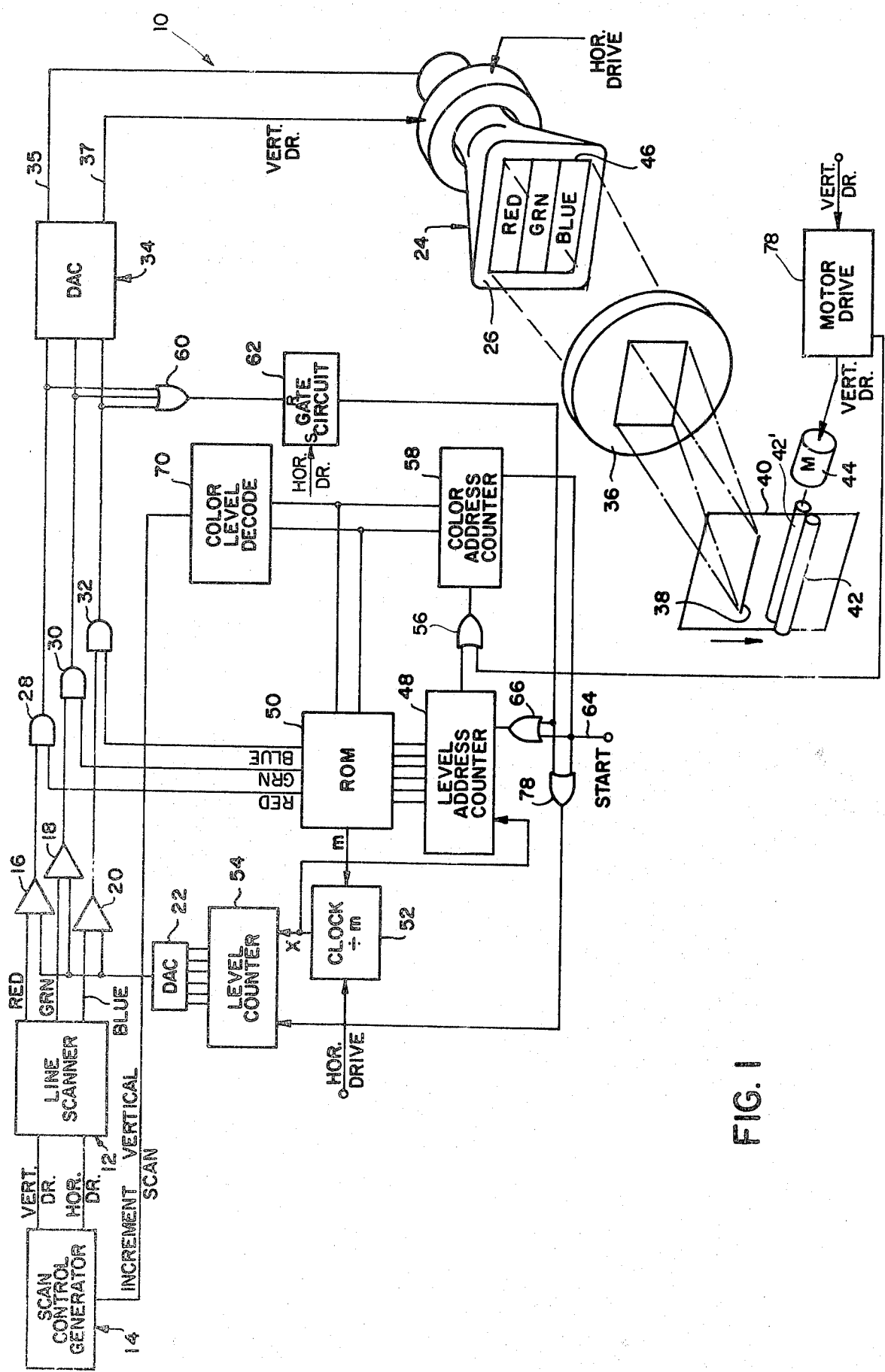
FIG. 1 is a schematic circuit diagram for one embodiment of the system of this invention.

Referring to FIG. 1, there is shown generally at 10 a system for exposing a photosensitive material to a video frame as represented by a video signal in the manner of this invention. The video frame to be recorded on the photosensitive material may be provided by any suitable type of film scanning system as shown generally at 12 such as a three linear array scanner or a flying spot cathode ray tube scanner. The flying spot cathode ray tube scanner generally comprises a cathode ray tube which receives horizontal and vertical electron beam deflection signals from a scanning control generator as shown generally at 14. The horizontal and vertical deflection signals from the scan control generator 14 are supplied to the flying spot CRT within the film scanning system 12. The horizontal deflection signal is also supplied to the horizontal deflection circuit of a cathode ray tube 24, and the vertical deflection signal is also supplied to a motor drive circuit 78 for reasons which will become apparent from the following discussion. The horizontal and vertical deflection signals from the generator 14 will be described by way of example as being digital although, as will be readily understood, analog signals could also be used.

The line scanner 12 may be used with suitable optics to provide the video signals for a video frame by scanning either the actual scene to be recorded by the system 10 on photosensitive material or a photographic image taken of the scene to be recorded by the system 10 on photosensitive material. The line scanner 12 provides simultaneously red, green, and blue color separation video signals to the input terminals of three respective comparators 16, 18, and 20. Each of the comparators 16, 18, and 20 provide an assertive (binary logic 1) output signal level when the video signal applied to its respective input signal lead exceeds a threshold defined by a reference voltage signal produced at the output of a digital-to-analog converter (DAC) 22 in a manner to be subsequently described herein.

Thus, each comparator 16, 18, and 20 will produce an assertive (binary logic 1) output signal level only if the respective color separation video signal to its input terminal is in excess of the voltage established by the output of the DAC 22. The output signals from the comparators 16, 18, and 20 are directed respectively to input terminals of AND gates 28, 30, and 32 which, in turn, provide output signals to another digital-to-analog converter (DAC) as shown generally at 34. The output from the DAC 34, in turn, controls by way of line 35 the intensity of the electron beam of the CRT 24 and by way of line 37 the vertical deflection of the electron beam of the CRT 24 in the manner of this invention.

A plurality of light determining strips as shown at 46 are provided to determine the color of the light emanating from the screen 26 of the CRT 24. The color determining strips 46 may comprise a plurality of differently colored filters arranged in generally parallel relation with respect to each other and parallel to the horizontal direction of deflection for the electron beam of the CRT 24. Alternatively, the color determining strips 46 may comprise a plurality of differently colored phosphors arranged in parallel relation with respect to each other along the inside of the screen of the CRT 24 in parallel relation with respect to the horizontal direction of deflection for the electron beam of the CRT 24. In the embodiment shown in FIG. 1, the light color determining strips 46 comprise a red, green, and blue strip arranged in parallel relation with respect to each other and with respect to the direction of horizontal deflection for the electron beam.

A lens system as shown generally at 36 is provided for focusing the colored light emanating from the plurality of light color determining strips 46 to a straight line 38. The photosensitive material to be exposed may comprise a photographic film sheet 40 stationed in the plane of the film exposing focused line 38 for incremental vertical movement in the manner of this invention by a pair of drive rollers 42 and 42'. The drive rollers 42, 42', in turn, are controlled by a motor 44 which may be a stepper motor incrementally stepped by the motor drive circuit 78 and controlled from the same vertical drive signal provided from the scan control generator 14 to the line scanner 12.

The arrangement of FIG. 1 also includes a level address counter 48, the output of which addresses a read only memory (ROM) 50 which provides an output number "m" that establishes the number of input pulses which a divide clock circuit 52 must receive before providing an output pulse signal to the x input terminal of a level counter 54. The divide clock circuit 52 receives its input pulses from the horizontal drive output of the scan control generator 14 and thus provides an output count to increment the level counter 54 every time the number of horizontal drive pulses equals the number "m" furnished from the ROM 50. The ROM 50 is further addressed by a color address counter 58 which receives an input count by way of an OR gate 56 from the level address counter 48 as well as from the motor drive circuit 78.

A gate circuit 62 receives a binary input signal from an OR gate 60, the inputs to which connect respectively to the outputs from the AND gates 28, 30, and 32. The output from the gate circuit 62, in turn, is directed to respective input terminals of a pair of OR gates 66 and 78. The output signals from the OR gates 66 and 78, in turn, are directed respectively to the clear or reset input terminals of the level counters 48 and 54. The color address counter 58 is decoded by a color level decode circuit 70 in a manner to be subsequently described to provide a vertical scan increment signal to the scan control generator 14. A start command input signal may be applied at input terminal 64 to clear the color address counter 58. The level address counter 48 and the level counter 54 are also cleared by the start signal which is transmitted to the level address counter 48 by way of the OR gate 66 and to the level counter 54 by way of the OR gate 78.

Referring now to FIG. 2, there is shown the characteristic curve of the photosensitive material to which the exposure is tailored to match. Experimentally, the photosensitive film 40 is exposed to light of a predetermined level for variable periods of time in order to create curve 74, which may determine the characteristic curve of the film, because it represents the relationship between the density of the film as a function of its exposure. Curve 74 is shown by way of example only and represents a typical type of a curve, which curve being a function of the particular film involved, as well as the dominant wavelength of the light incident on the film. In other words, where color photography is being utilized, a characteristic curve would be generated for each of the three primary colors, red, green, and blue, and the curve shown in FIG. 2 is merely illustrative of any one of the curves that would be obtained.

In preparation for incorporating the characteristic curve into the exposure system 10 of FIG. 1 for obtaining an exposure of the photosensitive material from a video image, curve 74 may be redrawn as shown in FIG. 3 by normalizing the percent reflected shown in FIG. 2. That is to say, the maximum reflectance shown in FIG. 2 may be, for the example shown, 62.5 percent which would constitute the unit normalized reflectance. Curve 76 shown in FIG. 3 is the normalized characteristic curve for a particular film such as that shown at 40 in a given color. If the normalized reflectance is divided into eight levels of exposure as indicated in FIG. 3, then the number of line scans by a constant intensity electron beam to which the film must be exposed to obtain proper exposure for each level is determined by the intercept of that exposure level with the curve 76. Results are summarized in the chart as shown at FIG. 4, where, for example, it can be seen that about 90 line scans by a constant intensity electron beam are required to properly expose any point or pixel along the focused line 38 whose brightness level is one. To properly expose a point or a pixel along the line scan whose brightness level is "two", a total of 140 line scans by a constant intensity electron beam would be required. However, because 90 line scans have already been achieved to properly expose the level one points, only 50 additional line scans are required for level "two" points. Thus, the column at the right in FIG. 4 represents the incremental change in line scans required on a level-by-level basis to achieve eight different levels of exposure of the photographic film 40 which corresponds to the eight levels of film reflectance shown by the normalized curve of FIG. 3.

The read only memory (ROM) 50 constitutes a look-up table in which the aforementioned information from the characteristic curve of FIG. 3 is tabulated for each of the red, blue, and green color separation video signals. If the right-hand column of the chart shown in FIG. 4 constitutes the number of line scans that must be applied in order to achieve proper exposure at the various levels as indicated in the chart, then the contents of the right-hand column of this chart would constitute the contents of the read only memory (ROM) 50 for one of the color separation signals. In like manner, the other color separation signals in the look-up table would be determined, and the contents of the read only memory would be established.

The level address counter 48 may be a six bit counter and address the read only memory (ROM) 50 in accordance with the level under consideration, whereas the color address counter 58 may be a two bit counter to address the read only memory (ROM) 50 in accordance with the color separation signal being utilized.

The photosensitive material 40 may be exposed to the video signals representing a video frame from the line scanner 12 in the following manner. A start command signal is first applied to the start input terminal 64 to clear the counters 48, 54 and 58. At this time, the photosensitive material 40 is held by the rollers 42, 42'. The horizontal drive output from the scan control generator 14 is preferably in the order of a 2,000 to 5,000 Hz pulse train. Clearing the color address counter 58 to its "zero" level in the aforementioned manner operates to signal the color level decode 70 to provide a vertical scan incrementing signal to the scan control generator 14. The scan control generator 14, in turn, provides a vertical drive signal to vertically drive the electron beam of the line scanner 12 CRT to the start position at the top of the image to be recorded while at the same time signaling the motor drive 78 to step the motor 44 so as to incrementally advance the film 40 so that the focused exposure line 38 extends across the top of the photosensitive area to be exposed. At the same time that the motor drive circuit 78 is signaled, it also provides an output pulse by way of the OR gate 56 to the color address counter 58. The color address counter 58 responds to this output pulse from the motor drive circuit 78 by addressing the read only memory (ROM) 50 so as to access that look-up table corresponding to the red color separation signals. The read only memory, in turn, responds by providing a positive (binary logic 1) input signal level to the AND gate 28 so as to enable the AND gate 28 to gate the output signals from the comparator 16 to the digital-to-analog converter 34 while simultaneously providing low (binary logic 0) input signal levels to disable the AND gates 30 and 32 from gating the output signals from the comparators 30 and 32 to the digital-to-analog converter 34.

The level address counter 48 simultaneously applies its "zero" level to the read only memory 50 so as to address that cell on the read only memory corresponding to the first exposure level in the chart of FIG. 4 wherein 90 line scans with constant electron beam intensity are required for full exposure. Thus, for the first level addressed, the output divisor "m" from the read only memory (ROM) 50 is 90 and 90 horizontal line scans are required for the divide clock 52 to provide one output pulse to the level counter 54. Whereas the level counter 54 is initially cleared to provide a zero binary output count, the digital-to-analog converter 22 provides a predetermined reference signal input level to the comparator 16 corresponding to the normalized reflectance level 0.2 in the curve of FIG. 3. Thus, if the amplitude defined by the red color separation signal of the video signal is greater than the amplitude of the reference signal provided to the comparator 16, the comparator 16 will provide a positive (binary logic 1) output signal level to the AND gate 28 thereby providing a positive (binary logic 1) input signal level to the digital-to-analog converter 34.

Upon receipt of the binary logic input signal, the digital-to-analog converter 34 operates to provide a vertical drive signal along line 37 to deflect the electron beam of the CRT 24 to the red strip of the plurality of color determining strips 46. At the same time, the output signal level from the digital-to-analog converter 34 along line 35 operates to turn on the beam of the CRT 24 to a constant intensity and thereby produce a spot of light on the screen of the CRT at a location depending upon the horizontal drive signal to the CRT 24 which corresponds to the horizontal drive to the line scanner 12. Thus, the location of the turned on electron beam along the red strip corresponds to the location of the electron beam in the line scanner 12. As is readily apparent, the lens system 36 operates to focus the red colored light from the screen of the CRT 24 to the line 38 so as to expose the photosensitive material 40 to a line of red light of intensity not exceeding the first level as shown in FIG. 4.

Conversely, if the amplitude defined by the red colored separation signal of the video signal does not exceed the reference signal applied to the comparator 16, there will be provided from the comparator 16 a low (binary logic 0) input signal level to the digital-to-analog converter 34 thereby causing the digital-to-analog converter 34 to provide the appropriate control signal along line 35 to turn off the beam of the CRT 24. Thus, under conditions where the amplitude defined by the red color separation signal is less than the level defined in FIG. 3, the electron beam of the CRT 24 will be turned off and the photosensitive material 40 will receive no exposing light along the focused exposure line 38. Therefore, a monochromatic two level binary brightness distribution is produced on the screen 26 of the CRT 24 to expose the photosensitive material 40 along the focused line 38.

After 90 horizontal line scans by the line scanner 12, the divide clock 52 will provide one output pulse to increment the level counter 54 to provide a binary output corresponding to the second level as shown in FIG. 3 and the chart of FIG. 4. The digital-to-analog converter 22 responds to the second binary output signal from the level counter 54 to provide an increase in the reference voltage signal level applied to the comparator 16 so as to correspond with the second exposure level as shown in FIG. 3. The output pulse from the divide clock 52 is also simultaneously directed to the level address counter 48 so as to increment the level address counter 48 to its next binary output thereby addressing the cell in the read only memory 50 corresponding to the second level of exposure in which 50 additional line scans are provided as shown in the chart of FIG. 4. Thus, the divisor m from the read only memory 50 changes to 50 and 50 additional horizontal line scans are required for the second level of exposure.

The divide by clock 52 continues to count in the aforementioned manner with each exposure level having the number of horizontal line scans as shown in the chart of FIG. 4, and with the digital-to-analog converter 22 providing a step increase in the reference voltage signal level corresponding to each level increase as shown in FIG. 3 until reaching the last eighth level where 30 horizontal line scans are provided After the 30th horizontal line scan by the line scanner 12, the divide clock 52 provides an output pulse which clears the level counter 54 and the level address counter 48. Clearing the level address counter 48, in turn, provides a signal by way of the OR gate 56 to increment the color address counter 58 to address the next column in the read only memory (ROM) 50 corresponding to the green color separation information table. The read only memory (ROM) 50, in turn, responds by providing a positive (binary logic 1) input signal to the AND gate 30 so as to enable the AND gate 30 to gate the output signals from the comparator 18 to the digital-to-analog converter 34. At the same time, the read only memory (ROM) 50 provides low (binary logic 0) output signal levels to respective input terminals of the AND gates 28 and 32 to disable the AND gates 28 and 32 from gating output signals respectively from the comparators 16 and 20 to the digital-to-analog converter 34.

Whereas the level address counter 48 and the level counter 54 are again cleared back to the zero binary count, the digital-to-analog converter 22 provides the reference signal level to the comparator 18 corresponding to the first level as shown in FIG. 3. Thus, if the amplitude defined by the green color separation signal is greater than the reference signal level furnished to the comparator 18, the comparator 18 will provide a positive (binary logic 1) output signal level to the AND gate 30 which will, in turn, gate the positive (binary logic 1) input signal level to the digital-to-analog converter 34. The digital-to-analog converter 34, in turn, responds to this binary input signal to provide a vertical drive signal along the output line 37 to deflect the electron beam of the CRT 24 to the green strip across the screen 26. The digital-to-analog converter 34 again provides a control signal along the line 35 to turn on the beam of the CRT 24 to a constant intensity to produce a spot of light on the screen 26 along the green strip. Again, if the amplitude defined by the green color separation signal does not exceed the reference signal voltage level to the comparator 18, the digital-to-analog converter 34 will turn off the electron beam of the CRT 24 and no green exposing light will be provided along the focused line 38. Again, the level counters 54 and 48 count upward in the aforementioned manner through the eight levels of exposure and thereafter reset back to a zero binary count level.

Resetting the level address counter 48 provides a positive (binary 1) output logic pulse to the color address counter 58 by way of the OR gate 56 so as to increment the address counter 58 to the next binary count which addresses the blue color separation information look-up table in the read only memory 50. The read only memory 50, in turn, provides a positive (binary logic 1) output signal level to the AND gate 32 so as to enable the output signals from the comparator 20 to be gated to the digital-to-analog converter 34 while simultaneously providing low (binary logic 0) output signal levels to respective input terminals of the AND gates 28 and 30 thereby simultaneously disabling the output signals from the comparators 16 and 18 from being respectively gated to the digital-to-analog converter 34.

Resetting level counter 54 back to its first level as shown in FIG. 3 provides a corresponding input reference signal level to the comparator 20 to which the amplitude defined by the blue color separation signal is compared. If the amplitude of the blue color separation signal is greater than the amplitude of the reference signal level to the comparator 20, there will be provided a positive (binary logic 1) input signal to the AND gate 32 which, in turn, will be gated to the digital-to-analog converter 34 so as to provide a vertical drive signal along line 37 to deflect the electron beam to the blue strip across the screen 26. The reference signal applied to the comparator 20 is thereafter incremented upwardly through the eight exposure levels as shown in FIG. 3 to expose the photographic material 40 to the blue color separation signal along the line 38. In this manner, the line 38 is fully exposed in sequence to the red, green, and blue color separation signals of the video signal to provide the full gamut of colors without use of rotating color filters as heretofore required.

After the photosensitive material 40 is exposed at the eighth level as shown by the chart in FIG. 4, the level counters 54 and 48 reset to a zero binary count output in the aforementioned manner. The level address counter 48 at the same time provides a positive (binary logic 1) output signal level by way of the OR gate 56 to increment the color address counter 58 and thereby reset the color address counter 58 to its original zero binary count output which is decoded by the color decode 70. The color decode 70, in turn, provides another vertical scan incrementing signal to the scan control generator 14. The scan control generator 14, in turn, provides another vertical drive signal to vertically increment the electron beam of the line scanner 12 CRT downwardly to its next position from its previously-described position. The vertical drive signal from the scan control generator 14 is also directed to the motor drive circuit 78 so as to step the motor 44 to drive the rollers 42 and 42' and thereby increment the photosensitive material upwardly so that the exposing focused line 38 assumes the position across the photosensitive material 40 corresponding to the new position of the horizontal line scan across the scanned image.

The aforementioned process is thereafter repeated with the photosensitive material being sequentially exposed along the incrementally displaced focused line 38 to the red, green, and blue light from the CRT 24. The color level decode 70 provides the vertical scan incrementing signals after the photosensitive material 40 has been fully exposed to the eight levels of red, green, and blue light, respectively. Each decode by the color level decode 70, in turn, increments the vertical drive signal to the line scanner 12 to move the horizontal line scan downwardly while at the same time stepping the motor 44 to drive the rollers 42 and 42' and advance the photosensitive material 40 upwardly across the focused line 38. In this manner, the horizontal line scan provided by the line scanner 12 is incrementally advanced across the video frame in correspondence with the incremental advancement of the exposing focused line 38 across the photosensitive material 40 so as to fully expose the photosensitive material 40, one line at a time, to the image being scanned by the line scanner 12.

Means are provided for accelerating the aforementioned process in the event that the amplitudes of any one of the color separation signals does not exceed its respective reference signal level from the digital-to-analog converter 22 at least once during its horizontal line scan. Thus, if the OR gate 60 does not receive at least one positive (binary logic 1) input signal level during the time period of one horizontal line scan, it may be assumed that the highest amplitude defined by that particular color separation signal has already been detected at that particular level and that it is no longer necessary to increment the digital-to-analog converter 22 through the remaining eight levels of reference signals. Thus, in the event that there is no positive (binary logic 1) signal level provided from any of the comparators 28, 30 and 32 during a single line scan, the gate circuit 62 will provide a clearing pulse to the level address counter 48 by way of the OR gate 66 and to the level counter 54 by way of the OR gate 78 to advance the system to the next color to be exposed along the focused line 38 and to incrementally advance the horizontal line scan across the image to be photographed in correspondence with the incremental advancement of the focused line across the photosensitive material if the color to which the film was last exposed is the last of the three separation colors.

Figure 5:
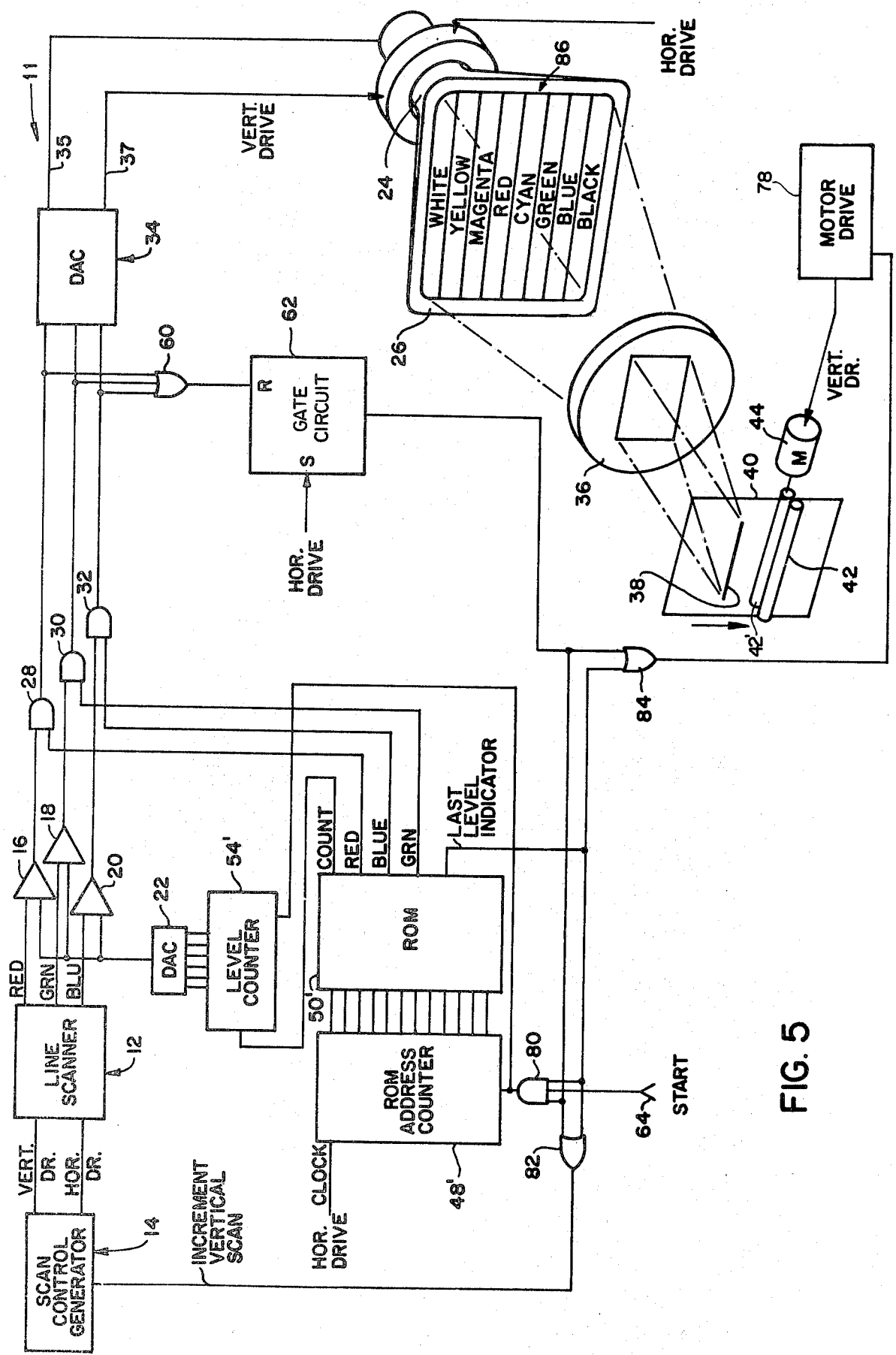
FIG. 5 is a schematic circuit diagram for an alternate embodiment of the system of this invention.

Referring now to FIG. 5 where like numerals designated previously-described elements, there is shown generally at 11 an alternate arrangement for a system for exposing the photosensitive material to the video frame in the manner of this invention. In this embodiment, a plurality of eight light color determining strips as shown in FIG. 7 are provided to determine the color of the light emanating from the screen 26 of the CRT 24. The color determining strips 86 again may comprise a plurality of differently colored filters arranged in generally parallel relation with respect to each other and parallel to the horizontal direction of deflection of the electron beam of the CRT 24. Alternatively, the color determining strips 86 may again comprise a plurality of differently colored phosphors arranged in parallel relation with respect to each other along the inside of the screen of the CRT 24 in parallel relation with respect to the horizontal direction of deflection from the electron beam of the CRT 24.

The read only memory (ROM) 50' constitutes a look-up table in which the aforementioned information from the characteristic curve of FIG. 3 is tabulated for each of the red, blue, and green color separation video signals. Thus again, if the right-hand column of the chart shown in FIG. 4 constitutes the number of line scans that must be applied in order to achieve proper exposure at the various levels as indicated in the chart, then the contents of the right-hand column of this chart would again constitute the contents of the read only memory (ROM) 50' for one of the color separation signals. In like manner, the other color separation signals and the look-up table would be determined, and the contents of the read only memory would be established. The ROM address counter 48' would address the read only memory (ROM) 50' in accordance with the level under consideration for all of the color separation signals simultaneously.

A start command signal is first applied to the start input terminal 64 and thereafter gated by an OR gate 80 to clear the address counter 48' so as to provide a zero binary count output signal therefrom to address the read only memory (ROM) 50' and access that look-up table which provides the binary logic output signals from the (ROM) 50' as shown in the first row of the chart of FIG. 6. The horizontal drive output from the scan control generator 14 is again preferably in the order of 2,000 to 5,000 Hz. The start command signal gated by the OR gate 80 is also directed to clear the level counter 54' to provide a zero binary output count therefrom which, in turn, is directed to the digital-to-analog converter 22 so as to cause the digital-to-analog converter 22 to provide a predetermined reference signal input level simultaneously to the comparators 16, 18 and 20 corresponding to the normalized reflectance level 0.2 in the curve of FIG. 3.

As is readily apparent from the top row of the chart of FIG. 6, the color logic (red, green, and blue) output signals from the read only memory (ROM) 50' are positive (binary logic 1) outputs which respectively enable the AND gates 28, 30, and 32 to gate the output signals respectively from the comparators 16, 18 and 20 to the digital-to-analog converter 34. The scan control generator 14 as previously discussed initially provides a vertical drive signal to vertically drive the electron beam of the line scanner 12 CRT to the start position at the top of the image to be recorded, while at the same time the film 40 is set in position between the rollers 42, 42' so that the focused line 38 extends across the top of the photosensitive area to be exposed. When the start signal is applied to the input terminal 64, the gate circuit 62 and the last level indicator output line from the read only memory (ROM) 50' simultaneously provide low (binary logic 0) output signal levels to an OR gate 84 which, in turn, provides a low (binary logic 0) output signal level to the motor drive 78.

During the first horizontal line scan of the line scanner 12, the red, green, and blue color separation signals are provided, respectively, to the comparators 16, 18 and 20 and simultaneously compared to the predetermined reference signal level provided by the digital-to-analog converter 22 which reference level corresponds to the normalized reflectance level 0.2 in the curve of FIG. 3. Thus, if the three red, green, and blue color separation signals from the line scanner 12 all exceed the reference signal level provided from the digital-to-analog converter 22, they will be gated respectively by the AND gates 28, 30 and 32 to provide three positive (binary logic 1) input signal levels to the digital-to-analog converter 34 since, as previously discussed, the AND gates 28, 30 and 32 are enabled into gating modes by the positive (binary logic 1) input signal levels received from the read only memory (ROM) 50' as shown in the top row of the chart in FIG. 6. Upon receipt simultaneously of the three (binary logic 1) input signal levels, the digital-to-analog converter 34 operates to provide a vertical drive signal along line 37 to deflect the electron beam of the CRT 24 to the white strip of the plurality of color determining strips 84 of FIG. 7. At the same time, the output signal level from the digital-to-analog converter 34 along the line 35 operates to turn on the beam of the CRT 24 to a constant intensity and thereby produce a spot of light on the screen of the CRT at a location depending upon the horizontal drive signal to the CRT 24 which corresponds to the horizontal drive to the line scanner 12. Thus, the location of the turned-on electron beam along the white strip corresponds to the location of the electron beam in the line scanner 12. Again, as is readily apparent, the lens system 36 operates to focus the white colored light on the screen of the CRT 24 to the line 38 so as to expose the photosensitive material 40 to a line of white light of intensity not exceeding the first level as shown in FIG. 3.

If only one of the color separation signals from the line scanner 12 exceeded the reference signal level provided by the digital-to-analog converter 22, then that assertive signal would be gated by the corresponding one of the AND gates 28, 30 and 32 to signal the digital-to-analog converter 34 to provide a corresponding vertical drive signal along the line 37 to deflect the electron beam of the CRT 24 to that particular strip of the red, green, and blue strips which corresponds to the color separation signal. In other words, if only the red color separation signal from the line scanner 12 exceeds the reference signal level provided by the digital-to-analog converter 22, then the digital-to-analog converter 34 will provide a vertical drive signal along line 37 to deflect the electron beam of the CRT to the red strip of the plurality of color determining strips 86 as shown in FIG. 7. In like manner, if only the green color separation signal from the line scanner 12 exceeded the reference signal level provided by the digital-to-analog converter 22, then the digital-to-analog converter 34 will operate to provide a vertical drive signal along line 37 to deflect the electron beam of the CRT 24 to the green strip of the plurality of color determining strips 86 of FIG. 7; and, if the blue color separation signal from the line scanner 12 is the only output signal to exceed the reference signal level from the digital-to-analog converter 22, then the digital-to-analog converter 34 will provide a vertical drive signal along line 37 to deflect the electron beam of the CRT 24 to the blue strip of the plurality of color determining strips 86 as shown at FIG. 7. In a similar manner, if the red and the green color separation signals from the line scanner 12 exceed the reference signal level provided by the digital-to-analog converter 22 and the blue color separation signal from the line scanner 12 does not exceed the reference signal level, then the digital-to-analog converter 34 will operate to provide a vertical drive signal along line 37 to deflect the electron beam of the CRT to the yellow strip of the plurality of color determining strips 86 of FIG. 7. Similarly, if the green and blue color separation signals from the line scanner 12 are the only two signals to exceed the reference signal level from the digital-to-analog converter 22, then the digital-to-analog converter 34 will provide a vertical drive signal along line 37 to deflect the electron beam of the CRT to the cyan strip of the plurality of the color determining strips; and, if the red and the blue color separation signals from the line scanner 12 are the only two signals to exceed the reference signal level provided by the digital-to-analog converter 22, then the digital-to-analog converter 34 will provide a vertical drive signal along line 37 to deflect the electron beam 34 to the magenta strip of the plurality of the color determining strips 86 as shown in FIG. 7. If none of the red, green, and blue color separation signals from the line scanner 12 exceed the reference signal level provided by the digital-to-analog converter 22, then the DAC 34 will provide a vertical drive signal along the line 37 to deflect the electron beam of the CRT to the black strip of the plurality of color determining strips 86 of FIG. 7. Alternatively, the digital-to-analog converter 34 could respond to the receipt of three low (binary logic 0) input signal levels from the AND gates 28, 30 and 32, respectively, by turning off the beam of the CRT 24. This, by itself, may be sufficient and deflection of the electron beam to a black strip may not be necessary. As is now readily apparent, any one of the eight colors defined by the red, green, and blue color separation signals may expose the film at any one instant during each horizontal line scan. Thus, the film need no longer be sequentially exposed to the red, green, and blue color separation signals in order to provide the full gamut of colors as previously described in the embodiment of FIG. 1.

The first horizontal line scan increments the address counter 48' to its next binary output signal thereby addressing that cell of the read only memory (ROM) 50' corresponding to the second row in the chart of FIG. 6. Although only one horizontal line scan has been described as being sufficient to increment the address counter 48', it would be readily apparent that a predetermined set of multiple line scans as illustrated in FIG. 4 might also be required to increment the address counter 48' in this manner. As is readily apparent, the only change in the output from the read only memory (ROM) 50' is that the blue color logic input signal level to the AND gate 32 changes from a positive (binary logic 1) signal level to a low (binary logic 0) signal level which operates to thereafter disable the AND gate 32 from gating through the output of the comparator 20 regardless of the level of the blue color separation signal with respect to the level of the reference signal provided by the digital-to-analog converter 22. Thus, upon the second horizontal sweep only the red and green color separation signals from the line scanner 12 can operate to determine the vertical deflection signal along the line 37 from the digital-to-analog converter 34, and the vertical deflection signal along the line 37 from the DAC 34 can operate to deflect the electron beam vertically to either the red, green, or yellow color determining strips as shown in FIG. 7.

The third horizontal line scan of the line scanner 12 operates to increment the address counter 48' to the third row across the chart of FIG. 6 where it can be seen that the only change in the output control signals from the read only memory (ROM) 50' are the output control signal level to the AND gate 30 which changes from a high (binary logic 1) signal level to a low (binary logic 0) signal level thereby disabling the AND gate 30 from gating through an assertive output signal to the digital-to-analog converter 34 regardless of the amplitude of the green color separation signal from the line scanner 12 with respect to the reference signal level from the digital-to-analog converter 22. As is readily apparent during the third line scan, the digital-to-analog converter 34 can be signaled only to provide a vertical deflection signal along the line 37 to the red color determining strip as shown in FIG. 7.

The fourth horizontal line scan further increments the address counter 48' to address that cell in the read only memory (ROM) 50' which provides the output as shown in the fourth row across the chart of FIG. 6 where there is no change in the output logic signal levels from the (ROM) 50' from that of row 3. Thus, again the fourth horizontal line scan can only provide a red color separation control signal to the digital-to-analog converter 34 which, in turn, operates by deflecting the electron beam to the red color determining strip of FIG. 7. In this manner, there is maintained the ratio of four red line scans to two green line scans to one blue line scan which operates to compensate for the spectral characteristics of the color determining phosphor strips and film.

The fourth horizontal line scan by the line scanner 12 operates to increment the address counter 48' to address that cell in the read only memory (ROM) 50' which corresponds to the fifth row in the chart of FIG. 6. The change in the output signal level at the count output line 35 from the read only memory (ROM) 50' from a low (binary logic 0) output signal level to a high (binary logic 1) output signal level operates to increment the level counter 54' to provide a binary output corresponding to the second level as shown in FIG. 3. The digital-to-analog converter 22, in turn, responds to the second binary output signal level from the counter 54' to provide an increase in the reference voltage signal level applied to the comparators 16, 18 and 20 so as to correspond with the second level as shown in FIG. 3. The read only memory (ROM) 50' simultaneously provides positive (binary logic 1) output signal levels to enable the AND gates 28, 30 and 32 to simultaneously gate the three output signals provided by the comparators 16, 18 and 20, respectively, to the digital-to-analog converter 34. The second level of exposure is thus accomplished in the aforementioned manner with the horizontal line scans incrementing the address counter to address those cells in the read only memory (ROM) 50' which correspond to the sixth and seventh rows of the chart of FIG. 6.

After the last level of exposure is completed, the address counter 48' is incremented to address that cell in the read only memory (ROM) 50' which provides the binary output control signal levels as shown in the last row of the chart of FIG. 6. In the last row of FIG. 6, only the right-hand column provides a positive (binary logic 1) output signal level which is directed by way of the OR gate 80 to clear the address counter 48' and the level counter 54' by resetting the counters 48' and 54' to their original zero binary count output signals. A positive (binary logic 1) output signal level from the last level indicator line from the (ROM) 50' is also directed by way of an OR gate 82 to provide a vertical scan incrementing signal to the scan control generator 14. The scan control generator 14, in turn, provides another vertical drive signal to vertically increment the electron beam of the line scanner 12 CRT downwardly to its next position from its previously-described position. The positive (binary logic 1) output signal level from the (ROM) 50' along the last level indicator line is also directed by way of another OR gate 84 to the motor drive circuit 78 so as to step the motor 44 to drive the rollers 42 and 42' and thereby increment the photosensitive material upwardly so that the focused line 38 assumes the position across the photosensitive material 40 corresponding to the new position of the horizontal line scan across the scanned image. The aforementioned process is thereafter repeated with the photosensitive material being exposed along the incrementally displaced focused line 38.

Thus, as is now readily apparent, the left-hand count column of the chart of FIG. 6 operates to increment the level counter 54 through its eight levels of exposure as shown in FIG. 3 to complete the exposure of each focused line across the photosensitive material 40. The right-hand last level indicator column in the chart of FIG. 6, in turn, responds to the completion of the full eight levels of exposure so as to both incrementally advance the horizontal line scan provided by the line scanner 12 across the video frame while at the same time incrementally advancing the exposing focused line 38 across the photosensitive material 40. In this manner, the photosensitive material 40 is fully exposed one line at a time to the image being scanned by the line scanner 12.

As previously described, means are again provided for accelerating the aforementioned process in the event that the amplitudes of all the color separation signals do not exceed the reference signal level from the digital-to-analog converter 22 at least once during the horizontal line scan. Thus again, if the OR gate 60 does not receive at least one positive (binary logic 1) input signal level during the time period of one horizontal line scan, it may be assumed that the highest amplitude defined by the color separation signals has already been detected at that particular level and that it is no longer necessary to increment the digital-to-analog converter 22 through the remaining eight levels of reference signals. Thus, in the event that there is no positive (binary logic 1) signal level provided from any one of the comparators 28, 30 and 32 during a single line scan, the gate circuit 62 will provide a clearing pulse to the counters 48' and 54' by way of the OR gate 80 while at the same time providing the vertical scan incrementing pulse to the scan control generator 14 by way of the OR gate 82 to the motor drive circuit 78 by way of the OR gate 84.

Although the aforementioned systems have been described as utilizing the CRT 24 for providing the exposing beam of light for the film 40, it would be equally apparent that any two dimensional array of light emitting elements as shown in FIG. 8 may also be utilized in place of the CRT 24 wherein the horizontal drive would operate to sequentially control those elements along the horizontal x-axis which are energized in sequence whereas the vertical drive would operate to control those elements along the y-axis which are energized on that particular color determining strip as defined by the video signal for that line scan. It will be equally apparent that the two dimensional array of light emitting elements as shown in FIG. 8 could comprise either a plurality of light emitting diodes or a liquid crystal display as is well known in the art.

Other embodiments of the invention including additions, subtractions, deletions and other modifications of the preferred disclosed embodiments of the invention will be obvious to those skilled in the art and are within the scope of the following claims.

What is claimed is:

1. Apparatus for exposing a photosensitive material to a video frame represented by a video signal comprising:
   lighting means responsive to input control signals for providing along a focused line any one colored light at a time selected from a predetermined plurality of different light colors;
   means for stationing a sheet of photosensitive material along said focused line for exposure to the colored light from said lighting means;
   circuit means responsive to the video signal for providing said control signals to said lighting means for varying the intensity of said colored light provided by said light means along said focused line in response to the amplitude defined by the video signal at each instant and for simultaneously selecting a colored light from said plurality of different light colors as defined by the video signal at each instant so as to expose the photosensitive material along said focused line; and
   means for advancing said focused line across the photosensitive material in correspondence with each succeeding line across the video frame to which the photosensitive material is fully exposed.

2. The apparatus of claim 1 wherein said lighting means comprises: a plurality of light color determining strips arranged in parallel relation with respect to each other and lens means for focusing the colored light from said plurality of light color determining strips to said focused line and wherein said circuit means provides control signals to said lighting means so as to vary the light intensity along any one of said color determining strips at a time in correspondence with the amplitude and color defined by the video signal at each instant.

3. The apparatus of claim 2 wherein: the video signal comprises red, green, and blue color separation signals, said color determining strips comprise red, green, and blue strips; and said circuit means responds sequentially one at a time to the red, green, and blue color separation signals so as to vary the light intensity along said red, green, and blue strips respectively in correspondence with the amplitudes defined by said red, green, and blue color separation signals.

4. The apparatus of claim 2 wherein: the video signal comprises red, green, and blue color separation signals, said color determining strips comprise the eight different colors defined by the different combinations of said red, green, and blue color separation signals, and said circuit means responds simultaneously to said red, green, and blue color separation signals so as to vary the light intensity along any one of said strips at a time in correspondence with the amplitude and color defined by said video signal at that instant.

5. The apparatus of claim 3 or 4 wherein said circuit means comprises comparator means for comparing the amplitude defined by the video signal with a reference signal and for providing a first light intensity control signal when the amplitude defined by the video signal does not exceed the reference signal and a second light intensity control signal when the video signal does exceed the reference signal and wherein said lighting means responds to said second intensity control signal by providing an output light intensity substantially greater than the light intensity provided in response to said first intensity control signal and means for shifting said reference signal level through a plurality of predetermined levels wherein said reference signal level is maintained at each of said plurality of predetermined levels for a period of time functionally related to characteristics of the photosensitive material.

6. The apparatus of claim 5 wherein said reference signal shifting means comprises a level address counter whose contents at any one time represent one of the plurality of predetermined levels and a look-up table comprising a plurality of cells addressed by the contents of said address level counter, wherein the contents of the cell addressed by said counter at any one time represents the time during which the corresponding reference level signal is applied to said comparator as a function of the characteristics of the photosensitive material.

7. The apparatus of claim 6 wherein said reference signal shifting means comprises means responsive to the contents of a selected cell addressed by said level counter for producing an output pulse when the number of video line scans along the same line across the video frame equals a number determined by the cell addressed by said level counter at that time, a level counter incremented by the output of said output pulse means, and a DAC responsive to the contents of said level counter for producing the reference signal level corresponding to the cell addressed by said level counter at that time.

8. The apparatus of claim 3 or 4 wherein said lighting means comprises a CRT and said color determining strips comprise differently colored phosphor strips inside the screen of the CRT.

9. The apparatus of claim 3 or 4 wherein said lighting means comprises a CRT and said color determining strips comprise differently colored filter strips overlying the screen of the CRT.

10. The apparatus of claim 3 or 4 wherein said lighting means comprises a two dimensional array of light emitting elements and said color determining strips comprise differently colored filter strips overlying the face of said array of light emitting elements.

11. Apparatus for exposing a photosensitive material from a video signal comprising:
   a monochromatic CRT;
   a plurality of light color determining strips arranged in parallel relation with respect to each other and cooperatively associated with said CRT for determining the color of the light emanating from the screen of the CRT;
   lens means for focusing the colored light from said plurality of light color determining strips to a focused line;
   means for stationing a sheet of photosensitive material along said focused line for exposure to the colored light from said CRT; and
   circuit means responsive to the video signal for providing control signals to the CRT for deflecting the beam of the CRT in one direction generally parallel to said color determining strips and in correspondence with the elapsed time of the video signal while simultaneously deflecting the beam of the CRT in another direction to the position opposite the color strip corresponding to the color defined by the video signal at each instant so as to expose the photosensitive material along said focused line to the color defined by the video signal at each instant.

12. The apparatus of claim 11 for exposing the photosensitive material to a video frame as represented by the video signal and including means for advancing said focused line across the photosensitive material in correspondence with each succeeding line across the video frame to which the photosensitive material is fully exposed.

13. The apparatus of claim 12 wherein the video signal comprises red, green, and blue separation signals, said color determining strips comprise red, green, and blue strips; and said circuit means responds sequentially one at a time to the red, green, and blue color separation signals so as to vary the CRT electron beam intensity along said red, green, and blue strips respectively in correspondence with the amplitudes defined by said red, green, and blue color separation signals.

14. The apparatus of claim 12 wherein the video signal comprises red, green, and blue color separation signals, said color determining strips comprise the eight different colors defined by the different combinations of said red, green, and blue color separation signals, and said circuit means responds simultaneously to said red, green, and blue color separation signals so as to vary the light intensity along any one of said strips at a time in correspondence with the amplitude and color defined by said video signal at that instant.

15. The apparatus of claim 13 or 14 wherein said circuit means comprises comparator means for comparing the amplitude defined by the video signal with a reference signal and for providing a first electron beam intensity control signal when the amplitude defined by the video signal does not exceed the reference signal and a second electron beam intensity control signal when the video signal does exceed the reference signal and wherein said CRT responds to said second intensity control signal by providing an electron beam intensity substantially greater than the electron beam intensity provided in response to said first intensity control signal and means for shifting said reference signal level through a plurality of predetermined levels wherein said reference signal level is maintained at each of said plurality of predetermined levels for a period of time functionally related to characteristics of the photosensitive material.

16. The apparatus of claim 13 or 14 wherein said color determining strips comprise differently colored phosphor strips inside the screen of the CRT.

17. The apparatus of claim 13 or 14 wherein said color determining strips comprise differently colored filter strips overlying the screen of said CRT.

18. Apparatus for exposing a photosensitive material from a video signal comprising:
a two dimensional array of light emitting elements;
a plurality of light color determining strips arranged in parallel relation with respect to each other and cooperatively associated with said light emitting elements for determining the color of the light emanating from said array;
lens means for focusing the colored light from said plurality of light color determining strips to a focused line;
means for stationing a sheet of photosensitive material along said focused line for exposure to the colored light from said array; and
circuit means responsive to the video signal for providing control signals to said array for sequentially energizing said light emitting elements one at a time in a direction generally parallel to said color determining strips and in correspondence with the elapsed time of the video signal, each of said energized elements also being selected to be opposite the color strip corresponding to the color defined by the video signal at that instant so as to expose the photosensitive material along said focused line to the color defined by the video signal at each instant.

19. The apparatus of claim 18 for exposing the photosensitive material to a video frame as represented by the video signal and including means for advancing said focused line across the photosensitive material in correspondence with each succeeding line across the video frame to which the photosensitive material is fully exposed.

20. The apparatus of claim 19 wherein the video signal comprises red, green, and blue color separation signals, said color determining strips comprise red, green, and blue strips; and said circuit means responds sequentially one at a time to the red, green, and blue color separation signals so as to vary the energization of said elements along said red, green, and blue strips respectively in correspondence with the amplitudes defined by said red, green, and blue color separation signals.

21. The apparatus of claim 19 wherein the video signal comprises red, green, and blue color separation signals, said color determining strips comprise the eight different colors defined by the different combinations of said red, green, and blue color separation signals, and said circuit means responds simultaneously to said red, green, and blue color separation signals so as to vary the energization of said elements along any one of said strips at a time in correspondence with the amplitude and color defined by said video signal at that instant.

22. The apparatus of claim 20 or 21 wherein said circuit means comprises comparator means for comparing the amplitude defined by the video signal with a reference signal and for providing a first intensity control signal when the amplitude defined by the video signal does not exceed the reference signal and a second intensity control signal when the video signal does exceed the reference signal and wherein said array responds to said second intensity control signal by providing a light intensity substantially greater than the light intensity provided in response to said first intensity control signal and means for shifting said reference signal level through a plurality of predetermined levels wherein said reference signal level is maintained at each of said plurality of predetermined levels for a period of time functionally related to the characteristics of the photosensitive material.

23. The apparatus of claim 20 or 21 wherein said array comprises a plurality of light emitting diodes and said color determining strips comprise differently colored filter strips overlying said diodes.

24. The apparatus of claim 20 or 21 wherein said array comprises a liquid crystal display and said color determining strips comprise differently colored filter strips overlying said display.

* * * * *